United States Patent
Lu et al.

(10) Patent No.: US 12,463,534 B2
(45) Date of Patent: Nov. 4, 2025

(54) VOLTAGE PROVISION CIRCUITS AND METHODS FOR OPERATING THE SAME

(71) Applicant: Taiwan Semiconductor Manufacturing Company, Ltd., Hsinchu (TW)

(72) Inventors: Cheng Han Lu, Hsinchu (TW); Chia-Fu Lee, Hsinchu (TW); Yen-An Chang, Hsinchu (TW)

(73) Assignee: Taiwan Semiconductor Manufacturing Company, Ltd., Hsinchu (TW)

( * ) Notice: Subject to any disclaimer, the term of this patent is extended or adjusted under 35 U.S.C. 154(b) by 98 days.

(21) Appl. No.: 18/483,769

(22) Filed: Oct. 10, 2023

(65) Prior Publication Data
US 2025/0119060 A1    Apr. 10, 2025

(51) Int. Cl.
*H02M 3/07*    (2006.01)
*G11C 11/413*    (2006.01)

(52) U.S. Cl.
CPC .............. *H02M 3/07* (2013.01); *G11C 11/413* (2013.01)

(58) Field of Classification Search
CPC ........................................... H02M 3/07
See application file for complete search history.

(56) References Cited

U.S. PATENT DOCUMENTS

| | | | |
|---|---|---|---|
| 7,443,230 B2* | 10/2008 | Chen | H02M 3/07 |
| | | | 327/540 |
| 8,947,157 B2* | 2/2015 | Levesque | H03F 3/602 |
| | | | 327/536 |
| 11,190,182 B2* | 11/2021 | Balteanu | H02M 3/073 |
| 2010/0054074 A1* | 3/2010 | Ryu | G11C 5/145 |
| | | | 327/306 |
| 2015/0137773 A1* | 5/2015 | Miller | G05F 1/46 |
| | | | 323/234 |

\* cited by examiner

Primary Examiner — Sibin Chen
(74) Attorney, Agent, or Firm — FOLEY & LARDNER LLP

(57) ABSTRACT

A circuit is disclosed. The circuit includes a first pump circuit configured to receive a first reference voltage and provide an output voltage at a first level based on the first reference voltage. The circuit includes a second pump circuit configured to receive a second reference voltage and provide the output voltage at a second level based on the second reference voltage. The first reference voltage is lower than the second reference voltage, and the first level is lower than the second level.

20 Claims, 12 Drawing Sheets

VOLTAGE PROVISION CIRCUITS AND METHODS FOR OPERATING THE SAME

BACKGROUND

The semiconductor integrated circuit (IC) industry has experienced exponential growth. As ICs continue to scale down, more and more devices are integrated into the single chip. This scaling down process generally provides benefits by increasing production efficiency and lowering associated costs.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
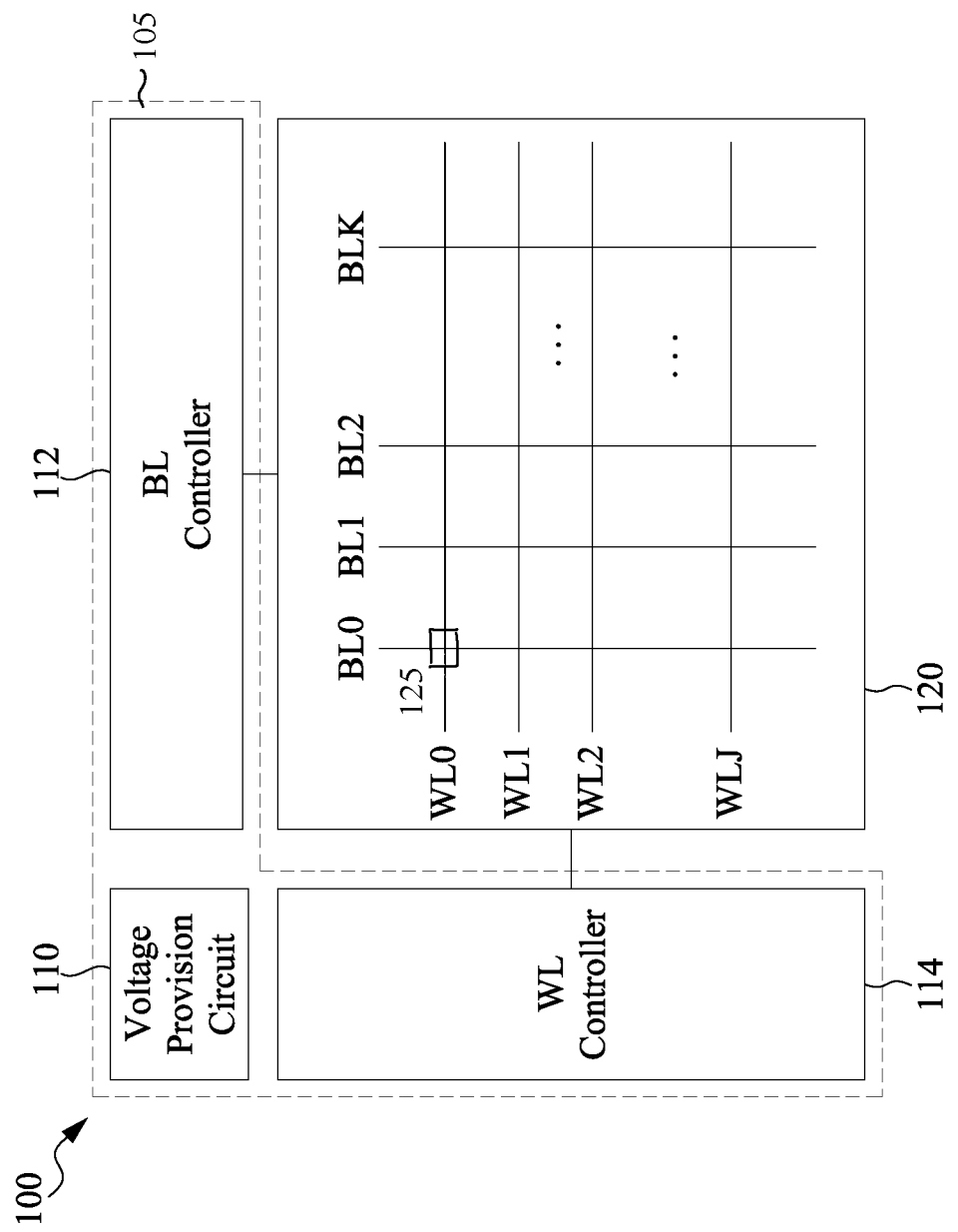
FIG. 1 illustrates an example block diagram of a memory device, in accordance with some embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over, or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" "top," "bottom" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

In accordance with the scaling down process, semiconductor memory devices are becoming more highly integrated and low operating supply voltages are being widely used. However, even memory devices that operate at a low voltage may sometimes need high voltage power supply for certain internal circuits and operations such as driving bit lines and word lines. For such a purpose, a variety of voltage provision circuits for generating high voltage (e.g., voltage or charge pump systems) have been developed. In general, such a charge pump system can multiply a supply voltage to generate an output voltage at a relatively high level. The charge pump system has a wide range of applications including liquid-crystal display (LCD) drivers, micro electro-mechanical systems (MEMS), power-supply generation, and the programming of (e.g., nonvolatile) memory devices.

In the existing technologies, the charge pump system typically relies on a single reference voltage or a single voltage pump (i.e., single driving capability) to boost, pump, or otherwise increase a supply voltage from its original level to a relatively high level. With only one single reference voltage, a trade-off between the amount of voltage ripple around the boosted voltage and a setup time is commonly required. For example, when the setup time is configured to be short, the amount of voltage ripple is typically high; and when the amount of voltage ripple is configured to be low, the setup time to reach a target voltage level is typically long. Thus, the existing voltage provision circuits have not been entirely satisfactory in certain aspects.

The present disclosure provides various embodiments of a voltage provision circuit that includes a first pump circuit and a second pump circuit. These first and second pump circuits may be configured with respectively different driving capabilities. For example, the first pump circuit, with a relatively high driving capability, can first boost a supply voltage to a first target level during a first time period, and the second pump circuit, with a relatively low driving capability, can then further boost the supply voltage to a second, higher target level during a second time period. By configuring different driving capabilities of pump circuits to operate during respective time periods, the voltage provision circuit, as disclosed herein, can quickly boost a supply voltage to a target level while being immune from high ripple voltage (i.e., without the above-mentioned trade-off). In one aspect of the present disclosure, the first and second pump circuits can rely on (e.g., receive) different reference voltages to reach the first and second target levels, respectively. In another aspect of the present disclosure, the first and second pump circuits can rely on (e.g., receive) a same reference voltages to reach the first and second target levels, respectively.

FIG. 1 illustrates a diagram of a memory device 100 including a memory controller 105 and a memory array 120, in accordance with various embodiments. In one aspect, the memory array 120 is embodied as a semiconductor memory device. The memory array 120 includes a plurality of storage circuits or memory cells 125. The memory array 120 includes word lines WL0, WL1 ... WLJ, each extending in a first direction (e.g., X-direction) and bit lines BL0, BL1 ... BLK, each extending in a second direction (e.g., Y-direction). The word lines WLs and the bit lines BLs may each be a conductive metal or conductive rail. In one configuration, each memory cell 125 is coupled to a corresponding word line WL and a corresponding bit line BL, and can be operated according to voltages or currents through the corresponding word line WL and the corresponding bit line BL. In some embodiments, each bit line includes bit lines BL, BLB coupled to one or more memory cells 125 of a group of memory cells 125 disposed along the second direction (e.g., Y-direction). The bit lines BL, BLB may receive and/or provide differential signals. Each memory cell 125 may include a volatile memory, a non-volatile memory, or a combination of them. In some embodiments, each memory cell 125 is embodied as a static random access memory (SRAM) cell or other type of memory cell. In some embodiments, the memory array 120 includes additional lines (e.g., select lines, reference lines, reference control lines, power rails, etc.).

The memory controller 105 is a hardware component that controls operations of the memory array 120. In some embodiments, the memory controller 105 includes a bit line controller 112, a word line controller 114, and a voltage provision circuit 110. The bit line controller 112, the word line controller 114, and the voltage provision circuit 110 may be embodied as logic circuits, analog circuits, or a combination of them. In one configuration, the word line controller 114 is a circuit that provides a voltage or current through one or more word lines WL of the memory array 120, and the bit line controller 112 is a circuit that provides or senses a voltage or current through one or more bit lines BL of the memory array 120. In one configuration, the voltage provision circuit 110 is a circuit that provides a voltage signal to the bit line controller 112 and/or the word line controller 114. The bit line controller 112 may be coupled to bit lines BLs of the memory array 120, and the word line controller 114 may be coupled to word lines WLs of the memory array 120. In some embodiments, the memory controller 105 includes more, fewer, or different components than shown in FIG. 1.

In various embodiments, the voltage provision circuit 110 may generate a boosted voltage signal to the bit line controller 112 and/or the word line controller 114 for desired read/write performance. For example, to write data at a memory cell 125, the voltage provision circuit 110 can provide a boosted write voltage (or bias) to the word line controller 114, causing the boosted write voltage to be sent to the memory cell 125 through a corresponding word line WL. This allows a bit line and/or complementary bit line of the memory cell 125 to discharge faster. Therefore, the required $VCC_{min}$ (minimum operating voltage) of the memory cell 125 (and the memory array 120 as a whole) at a particular write speed can be lowered when the voltage on the word line is boosted. In another example, during a read operation of the memory cell 125, the voltage on the word line can be boosted to more than the $VCC_{min}$, which allows the voltage present on the bit line to discharge faster. Accordingly, a read speed of the memory cell 125 (and the memory array 120 as a whole) can be increased.

Figure 2:
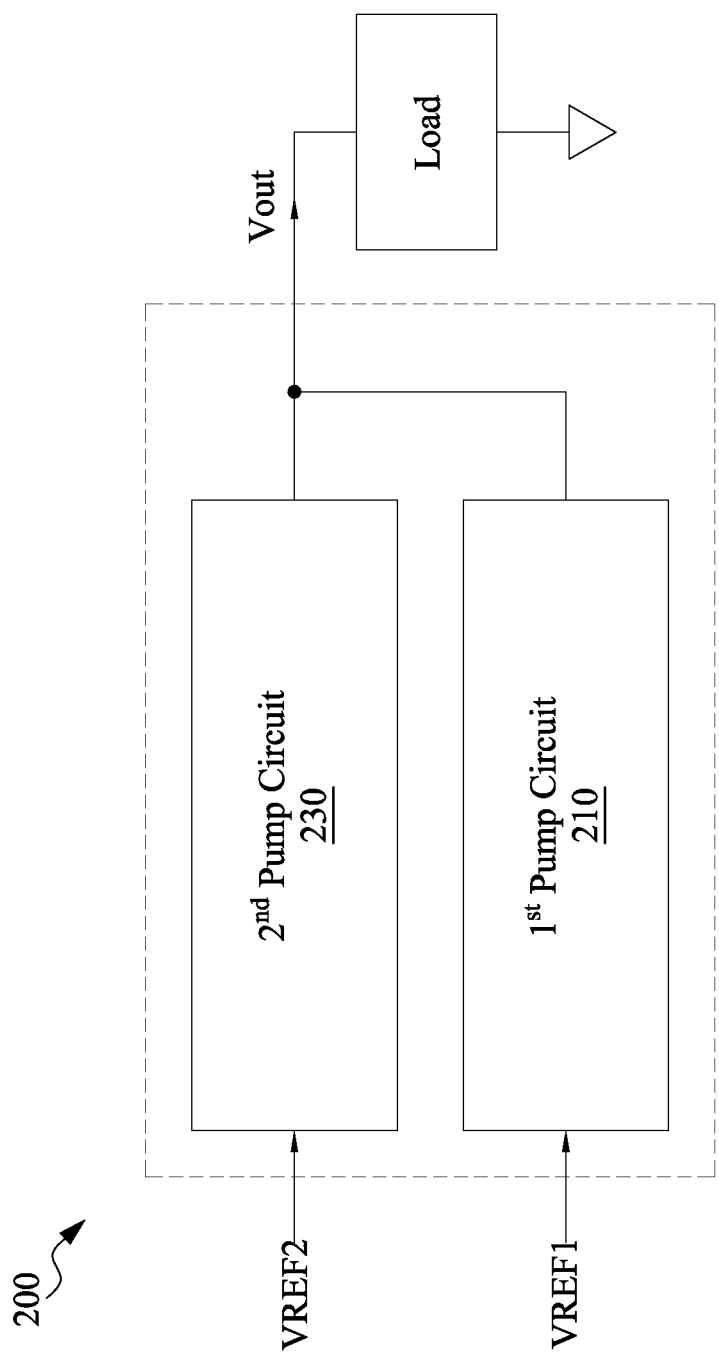
FIG. 2 illustrates an example block diagram of a voltage provision circuit, in accordance with some embodiments.

FIG. 2 illustrates an example block diagram 200 of the voltage provision circuit 110 (hereinafter "voltage provision circuit 200"), in accordance with various embodiments. The voltage provision circuit 200 shown in FIG. 2 is simplified for illustration purposes, and thus, it should be appreciated that the voltage provision circuit 200 can include any of various other components while remaining within the scope of the present disclosure.

As shown, the voltage provision circuit 200 includes a first pump circuit 210 and a second pump circuit 230. In some embodiments, the first pump circuit 210 is configured to receive a first reference voltage (VREF1), and the second pump circuit 230 is configured to receive a second reference voltage (VERF2). The first pump circuit 210, with a high driving capability, can use the first reference voltage VREF1 to provide an output voltage (Vout) for a load circuit (e.g., a memory array) at a first level, and the second pump circuit 230, with a low driving capability, can use the second reference voltage VREF2 to provide the output voltage Vout at a second level. The second reference voltage VREF2 may be higher than the first reference voltage VREF1, and the second level may be higher than the first level.

Figure 3:
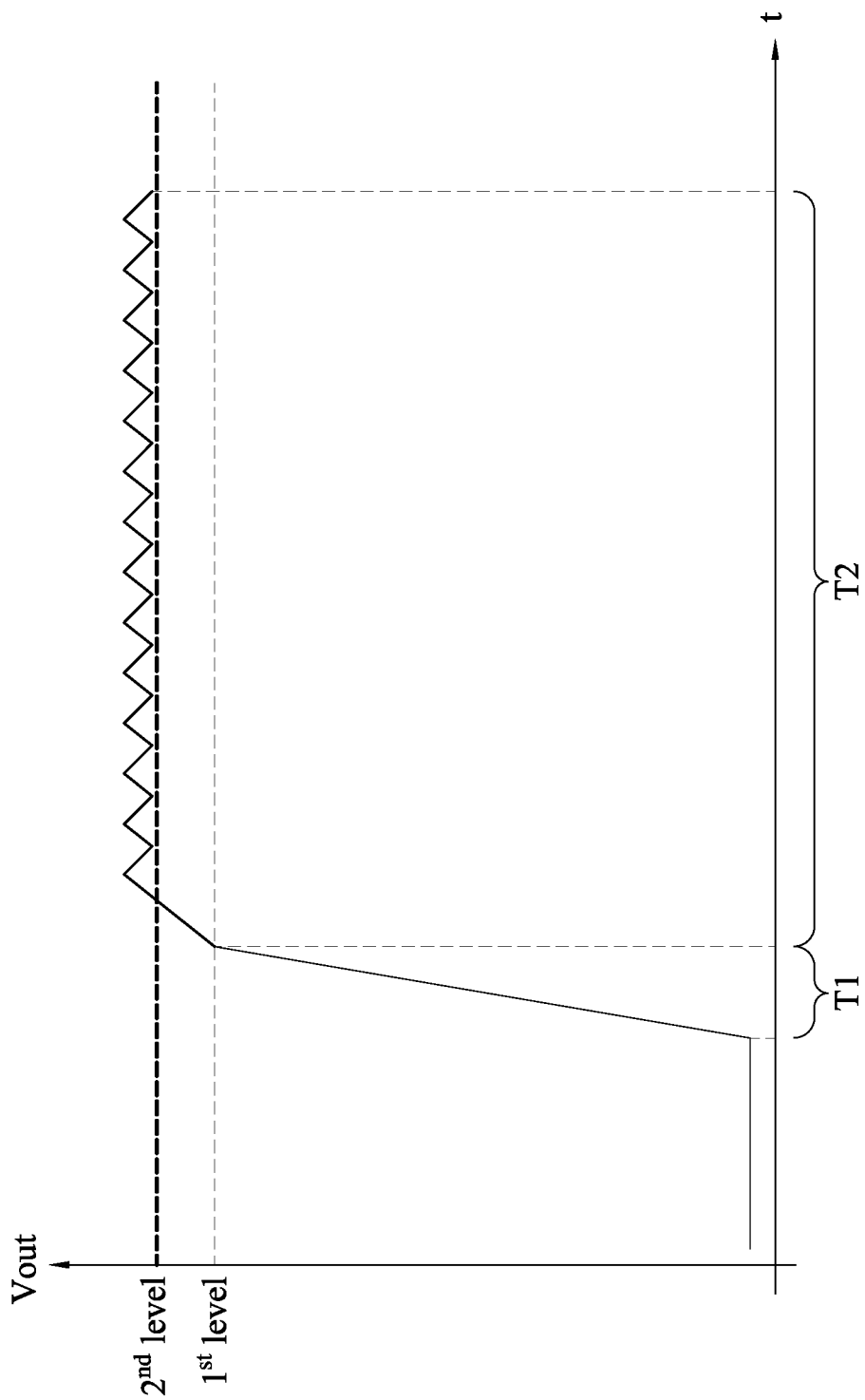
FIG. 3 illustrates a waveform an output voltage generated by the voltage provision circuit of FIG. 2, in accordance with some embodiments.

FIG. 3 illustrates an example waveform of the output voltage Vout varying over time, in accordance with various embodiments. The waveform shown in FIG. 3 is simplified for illustration purposes, and thus, it should be appreciated that the waveform may be scaled up or down while remaining within the scope of the present disclosure.

As shown, during a first time period (T1), the first pump circuit 210 may be activated (e.g., with the second pump circuit 230 also activated). As such, the output voltage Vout can be boosted to around a first level faster based on the first reference voltage VREF1. Next, during a second time period (T2), the second pump circuit 230 may be activated (e.g., with the first pump circuit 210 deactivated) so as to mainly rely on the second reference voltage VREF2 to further boost the output voltage Vout to around a second level. Specifically, the output voltage Vout may be ramped up with a faster rate during the first time period than the second time period. Upon the output voltage Vout reaching the first level, the first pump circuit 210 may be deactivated and the second pump circuit 230 can be activated to continue ramping up the output voltage Vout (but with a slower rate). In this way, the output voltage Vout can be further boosted to the second level, with desired low voltage ripple.

Figure 4:
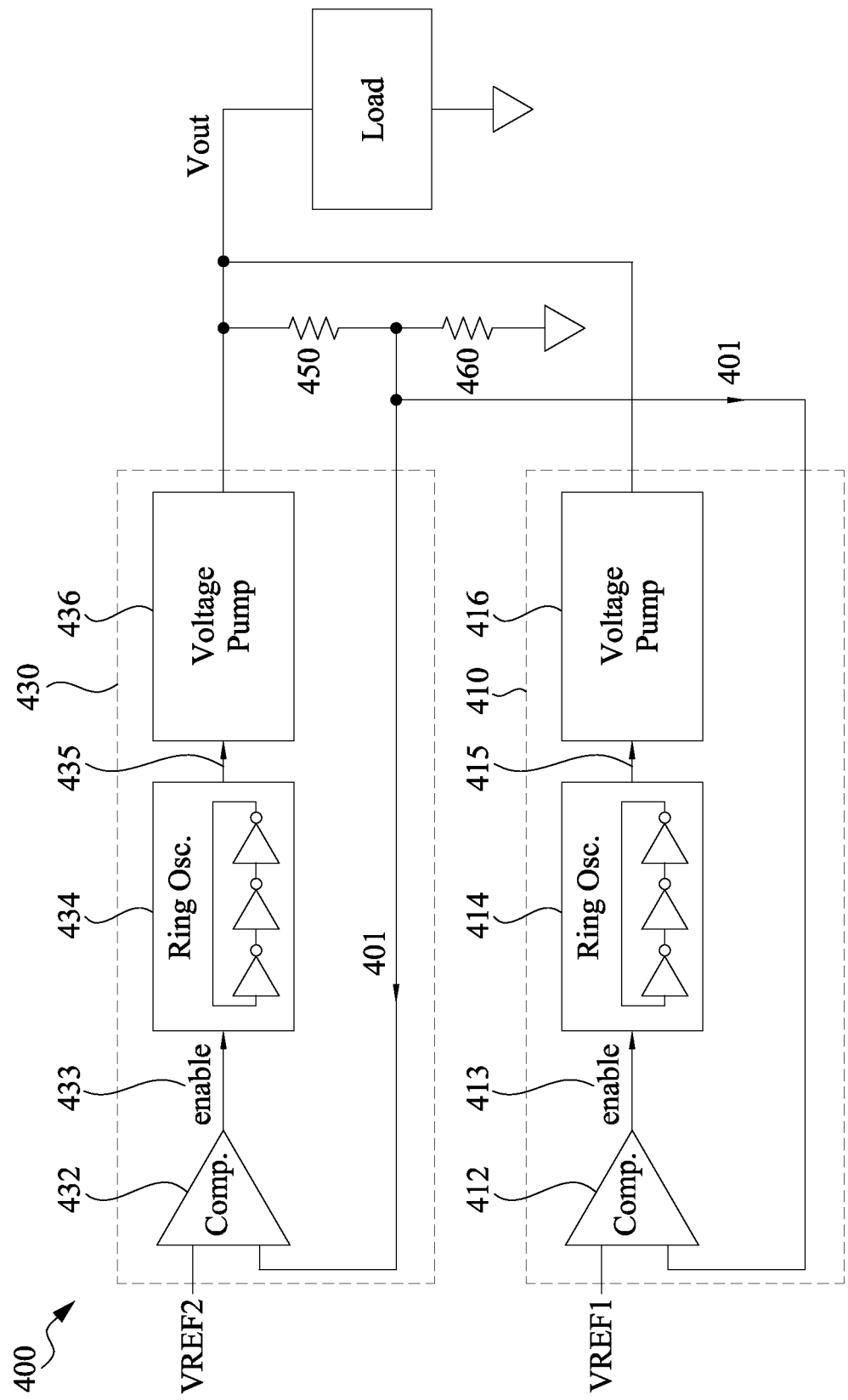
FIG. 4 illustrates an example schematic diagram of the voltage provision circuit of FIG. 2, in accordance with some embodiments.

FIG. 4 illustrates an example schematic diagram 400 of the voltage provision circuit 200 (hereinafter "voltage provision circuit 400"), in accordance with some embodiments. The voltage provision circuit 400 shown in FIG. 4 is simplified for illustration purposes, and thus, it should be appreciated that the voltage provision circuit 400 can include any of various other components while remaining within the scope of the present disclosure.

As shown, the voltage provision circuit 400 includes a first pump circuit 410 and second pump circuit 430 corresponding to the first pump circuit 210 and second pump circuit 230 of FIG. 2, respectively. The first pump circuit 410 can include a first comparator 412, a first oscillator 414, and a first voltage pump 416; and the second pump circuit 430 can include a second comparator 432, a second oscillator 434, and a second voltage pump 436.

The first comparator 412 has two inputs, one of which is configured to receive a first reference voltage VREF1 and the other of which is configured to receive a feedback signal 401, which will be discussed below. Based on a comparison between the first reference voltage VREF1 and the feedback signal 401, the first comparator 412 can output a first enable signal 413 at a certain logic state to the first oscillator 414. Upon receiving the first enable signal 413 at such a logic state, the first oscillator 414 can output a first clock signal 415 to the first voltage pump 416. Based on the first clock signal 415, the first voltage pump 416 can boost (e.g., pump) a supply voltage (e.g., VDD) to a multiple of the supply voltage at an output of the first pump circuit 410 as a first level of the output voltage Vout.

Similarly, the second comparator 432 has two inputs, one of which is configured to receive a second reference voltage VREF2 and the other of which is configured to receive the feedback signal 401. Based on a comparison between the second reference voltage VREF2 and the feedback signal 401, the second comparator 432 can output a second enable signal 433 at a certain logic state to the second oscillator 434. Upon receiving the second enable signal 433 at such a logic state, the second oscillator 434 can output a second clock signal 435 to the second voltage pump 436. Based on the second clock signal 435, the second voltage pump 436 can boost (e.g., pump) the supply voltage (e.g., VDD) to another multiple of the supply voltage at an output of the second pump circuit 430 as a second level of the output voltage Vout.

The voltage provision circuit 400 further includes a first resistor 450 and a second resistor 460. The first resistor 450 and the second resistor 460 are connected to each other at a common node, which presents a voltage as the feedback signal 401. For example, the common node is connected to the other input of the comparator 412 (that does not receive the first reference voltage VREF1), and to the other input of the comparator 432 (that does not receive the second reference voltage VREF2). Further, the other terminal of the second resistor 460 may be connected to ground, and the other terminal of the first resistor 450 may be connected to the output of the second pump circuit 430. Resistance values of the first resistor 450 and the second resistor 460 may correspond to each other with a certain (e.g., configured) ratio, causing the feedback signal 401 as a fraction of the output voltage Vout.

In some embodiments, the first pump circuit 410 has a driving capability stronger than the second pump circuit 430, causing the first level of the output voltage Vout to be ramped up quickly than the second level of the output voltage Vout. Further, the second reference voltage VREF2 may be configured higher than first reference voltage VREF1. For example, the first voltage pump 416 may have a first amount of capacitance (to pump the supply voltage VDD) and the second voltage pump 436 may have a second amount of capacitance (to pump the supply voltage VDD), in which the first amount is greater than the second amount. Details of the first and second voltage pumps will be discussed below with respect to FIG. 12.

Figure 5:
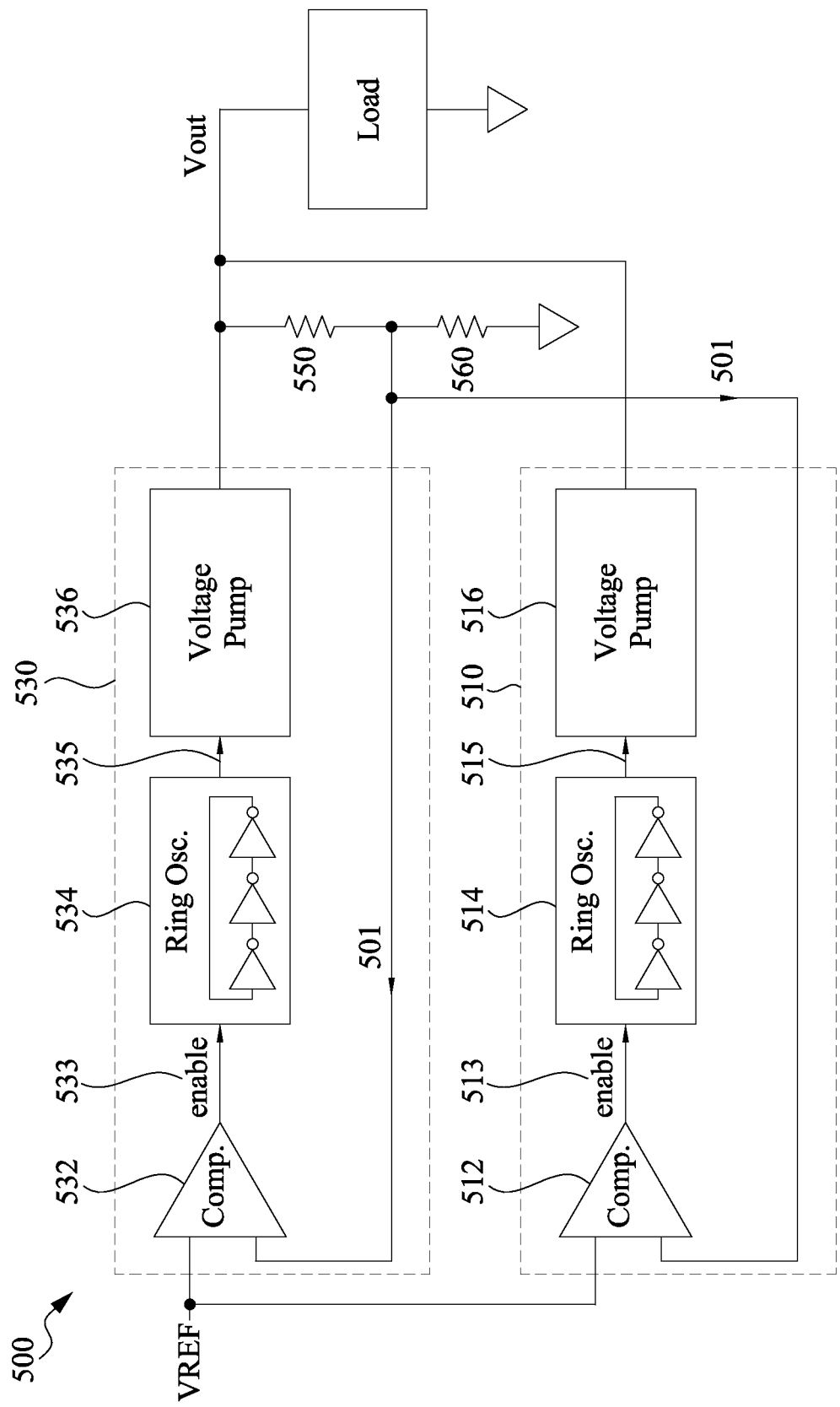
FIG. 5 illustrates another example schematic diagram of the voltage provision circuit of FIG. 2, in accordance with some embodiments.

FIG. 5 illustrates another example schematic diagram 500 of the voltage provision circuit 200 (hereinafter "voltage provision circuit 500"), in accordance with some embodiments. The voltage provision circuit 500 shown in FIG. 5 is simplified for illustration purposes, and thus, it should be appreciated that the voltage provision circuit 500 can include any of various other components while remaining within the scope of the present disclosure.

The voltage provision circuit 500 may be substantially similar to the voltage provision circuit 400 of FIG. 4, except that the voltage provision circuit 500 may rely on one reference voltage to provide different driving capabilities through respective pump circuits. For example, the voltage provision circuit 500 also includes a first pump circuit 510 and second pump circuit 530 corresponding to the first pump circuit 210 and second pump circuit 230 of FIG. 2, respectively. The first pump circuit 510 can include a first comparator 512, a first oscillator 514, and a first voltage pump 516; and the second pump circuit 530 can include a second comparator 532, a second oscillator 534, and a second voltage pump 536.

The first comparator 512 has two inputs, one of which is configured to receive a reference voltage VREF and the other of which is configured to receive a feedback signal 501, which will be discussed below. Different from the first comparator 412 (FIG. 4), the first comparator 512 may receive the feedback signal 501 with a preset offset. As such, the first comparator 512 can compare the reference voltage VREF with the offset feedback signal 501. Based on a comparison between the reference voltage VREF and the offset feedback signal 501, the first comparator 512 can output a first enable signal 513 at a certain logic state to the first oscillator 514. Upon receiving the first enable signal 513 at such a logic state, the first oscillator 514 can output a first clock signal 515 to the first voltage pump 516. Based on the first clock signal 515, the first voltage pump 516 can boost (e.g., pump) a supply voltage (e.g., VDD) to a multiple of the supply voltage at an output of the first pump circuit 510 as a first level of the output voltage Vout.

Similarly, the second comparator 532 has two inputs, one of which is configured to receive the same reference voltage VREF and the other of which is configured to receive the feedback signal 501 (without no offset). Based on a comparison between the reference voltage VREF and the feedback signal 501, the second comparator 532 can output a second enable signal 533 at a certain logic state to the second oscillator 534. Upon receiving the second enable signal 533 at such a logic state, the second oscillator 534 can output a second clock signal 535 to the second voltage pump 536. Based on the second clock signal 535, the second voltage pump 536 can boost (e.g., pump) the supply voltage (e.g., VDD) to another multiple of the supply voltage at an output of the second pump circuit 530 as a second level of the output voltage Vout.

The voltage provision circuit 500 further includes a first resistor 550 and a second resistor 560. The first resistor 550 and the second resistor 560 are connected to each other at a common node, which presents a voltage as the feedback signal 501. For example, the common node is connected to the other input of the comparator 512 (that does not receive the reference voltage VREF), and to the other input of the comparator 532 (that does not receive the reference voltage VREF). Further, the other terminal of the second resistor 560 may be connected to ground, and the other terminal of the first resistor 550 may be connected to the output of the second pump circuit 530. Resistance values of the first resistor 550 and the second resistor 560 may correspond to each other with a certain (e.g., configured) ratio, causing the feedback signal 501 as a fraction of the output voltage Vout.

In some embodiments, the first pump circuit 510 has a driving capability stronger than the second pump circuit 530, causing the first level of the output voltage Vout to be ramped up quickly than the second level of the output voltage Vout. For example, the first voltage pump 516 may have a first amount of capacitance (to pump the supply voltage VDD) and the second voltage pump 536 may have a second amount of capacitance (to pump the supply voltage VDD), in which the first amount is greater than the second amount. Details of the first and second voltage pumps will be discussed below with respect to FIG. 12.

Figure 6:
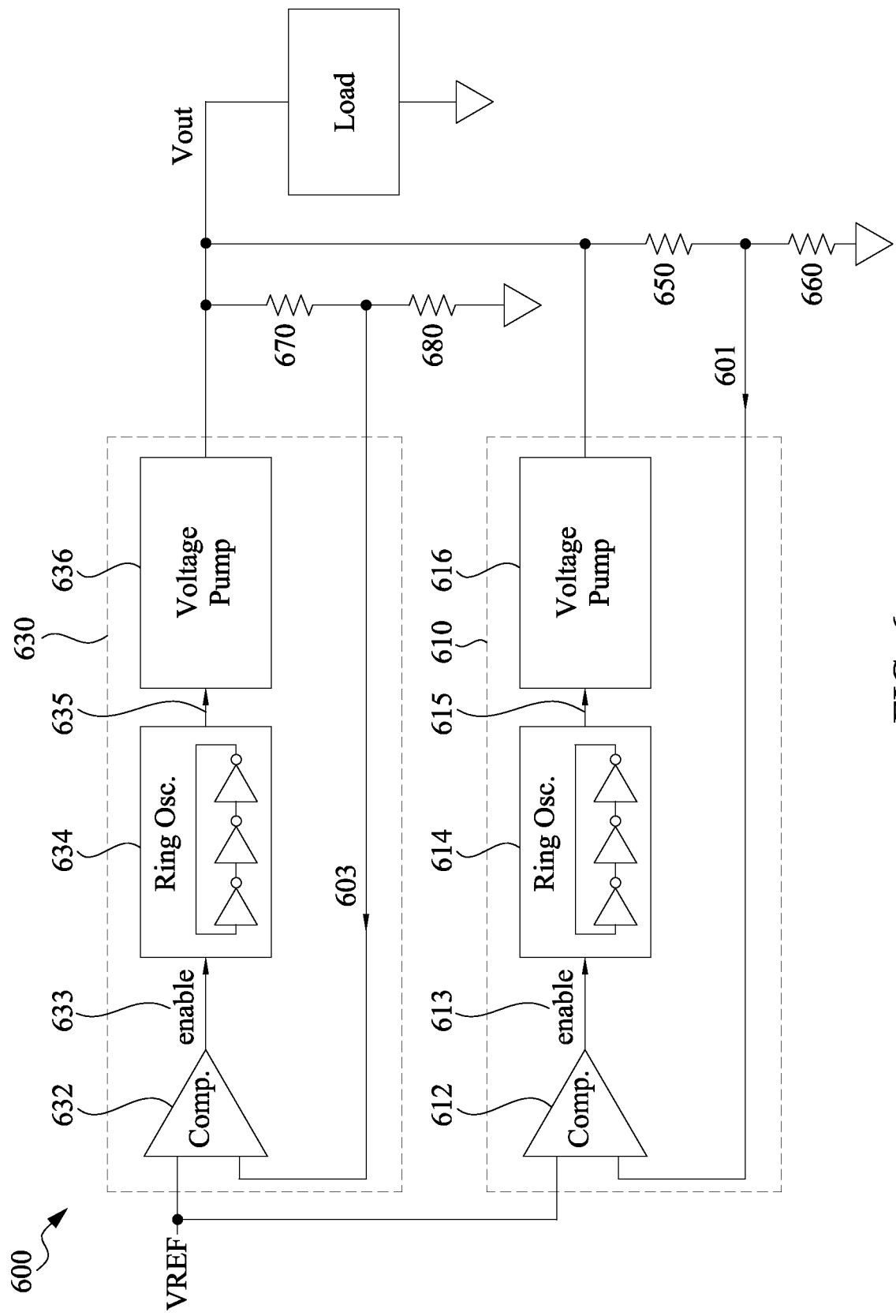
FIG. 6 illustrates yet another example schematic diagram of the voltage provision circuit of FIG. 2, in accordance with some embodiments.

FIG. 6 illustrates yet another example schematic diagram 600 of the voltage provision circuit 200 (hereinafter "voltage provision circuit 600"), in accordance with some embodiments. The voltage provision circuit 600 shown in FIG. 6 is simplified for illustration purposes, and thus, it should be appreciated that the voltage provision circuit 600 can include any of various other components while remaining within the scope of the present disclosure.

The voltage provision circuit 600 may be substantially similar to the voltage provision circuit 500 of FIG. 5, except that the voltage provision circuit 600 may further include another pair of resistors to compare with one reference voltage to provide different driving capabilities through respective pump circuits. For example, the voltage provision circuit 600 also includes a first pump circuit 610 and second pump circuit 630 corresponding to the first pump circuit 210 and second pump circuit 230 of FIG. 2, respectively. The first pump circuit 610 can include a first comparator 612, a first oscillator 614, and a first voltage pump 616; and the second pump circuit 630 can include a second comparator 632, a second oscillator 634, and a second voltage pump 636.

The first comparator 612 has two inputs, one of which is configured to receive a reference voltage VREF and the other of which is configured to receive a feedback signal 601, which will be discussed below. Different from the first comparator 512 (FIG. 5), the first comparator 612 may receive the feedback signal 601 that is a first fraction of output voltage Vout. As such, the first comparator 612 can compare the reference voltage VREF with the feedback signal 601. Based on a comparison between the reference voltage VREF and the offset feedback signal 601, the first comparator 612 can output a first enable signal 613 at a certain logic state to the first oscillator 614. Upon receiving the first enable signal 613 at such a logic state, the first oscillator 614 can output a first clock signal 615 to the first voltage pump 616. Based on the first clock signal 615, the first voltage pump 616 can boost (e.g., pump) a supply voltage (e.g., VDD) to a multiple of the supply voltage at an output of the first pump circuit 610 as a first level of the output voltage Vout.

Similarly, the second comparator 632 has two inputs, one of which is configured to receive the same reference voltage VREF and the other of which is configured to receive a feedback signal 603 that is a second fraction of output voltage Vout. Based on a comparison between the reference voltage VREF and the feedback signal 603, the second comparator 632 can output a second enable signal 633 at a certain logic state to the second oscillator 634. Upon receiving the second enable signal 633 at such a logic state, the second oscillator 634 can output a second clock signal 635 to the second voltage pump 636. Based on the second clock signal 635, the second voltage pump 636 can boost (e.g., pump) the supply voltage (e.g., VDD) to another multiple of the supply voltage at an output of the second pump circuit 630 as a second level of the output voltage Vout.

The voltage provision circuit 600 further includes a pair of first and second resistors, 650 and 660, and another pair of first and second resistors, 670 and 680. The first resistor 650 and the second resistor 660 are connected to each other at a common node, which presents a voltage as the feedback signal 601. For example, the common node is connected to the other input of the comparator 612 (that does not receive the reference voltage VREF). Further, the other terminal of the resistor 660 may be connected to ground, and the other terminal of the resistor 650 may be connected to the output of the first pump circuit 610. The first resistor 670 and the second resistor 680 are connected to each other at a common node, which presents a voltage as the feedback signal 603. For example, the common node is connected to the other input of the comparator 632 (that does not receive the reference voltage VREF). Further, the other terminal of the second resistor 680 may be connected to ground, and the other terminal of the first resistor 670 may be connected to the output of the second pump circuit 630. Resistance values of the first resistor 650 and the second resistor 660 may correspond to each other with a certain (e.g., configured) first ratio, causing the feedback signal 601 as a first fraction of the output voltage Vout, and resistance values of the first resistor 670 and the second resistor 680 may correspond to each other with a certain (e.g., configured) second ratio, causing the feedback signal 603 as a second fraction of the output voltage Vout.

In some embodiments, the first pump circuit 610 has a driving capability stronger than the second pump circuit 630, causing the first level of the output voltage Vout to be ramped up quickly than the second level of the output voltage Vout. For example, the first voltage pump 616 may have a first amount of capacitance (to pump the supply voltage VDD) and the second voltage pump 636 may have a second amount of capacitance (to pump the supply voltage VDD), in which the first amount is greater than the second amount. Details of the first and second voltage pumps will be discussed below with respect to FIG. 12.

Figure 7:
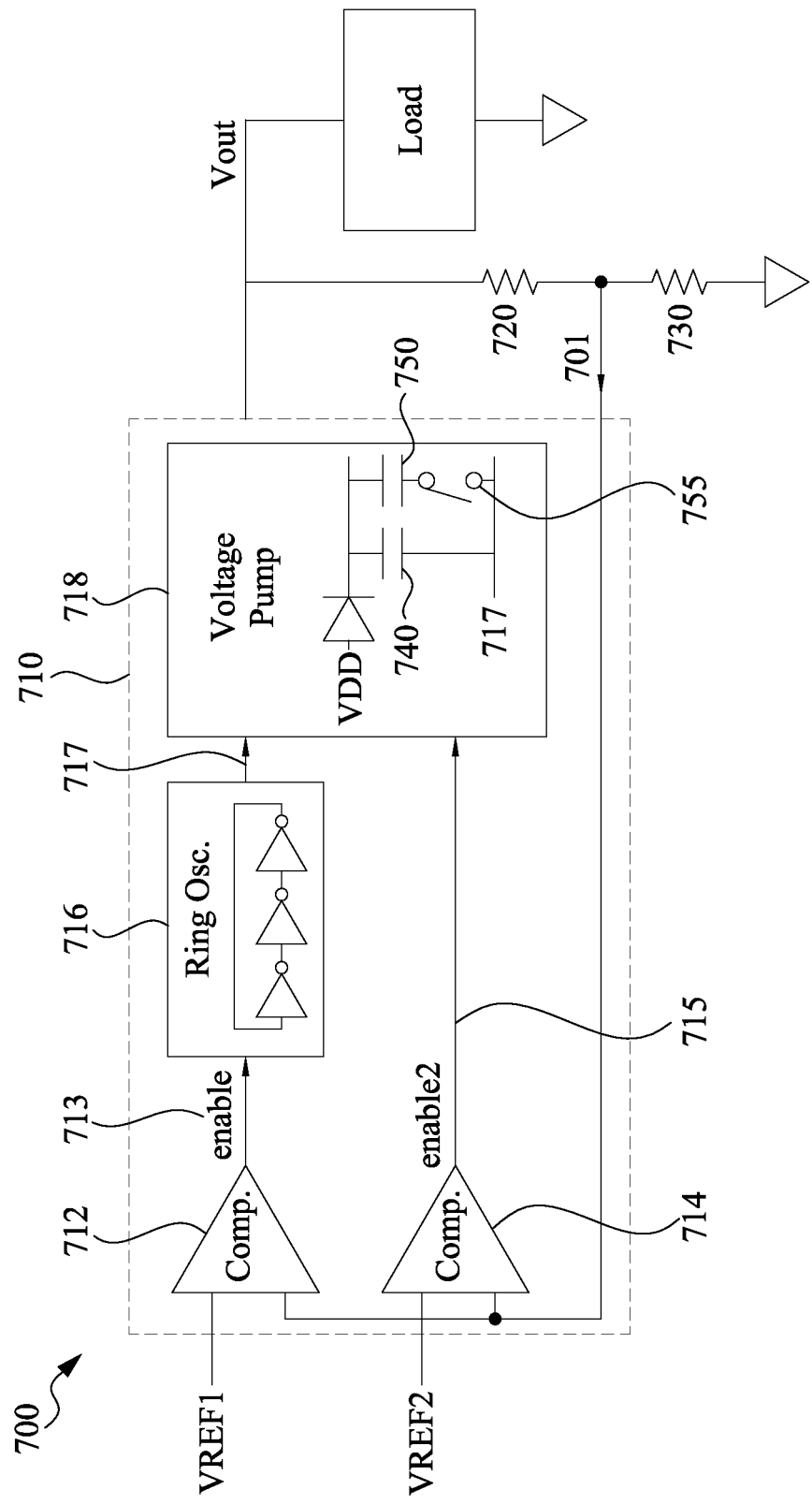
FIG. 7 illustrates yet another example schematic diagram of the voltage provision circuit of FIG. 2, in accordance with some embodiments.

FIG. 7 illustrates yet another example schematic diagram 700 of the voltage provision circuit 200 (hereinafter "voltage provision circuit 700"), in accordance with some embodiments. The voltage provision circuit 700 shown in FIG. 7 is simplified for illustration purposes, and thus, it should be appreciated that the voltage provision circuit 700 can include any of various other components while remaining within the scope of the present disclosure.

Different from the voltage provision circuits discussed above, the voltage provision circuit 700 may integrate the different driving capabilities (of multiple pump circuits) into a single pump circuit. However, such a pump circuit can still have driving capabilities based on two difference reference voltages. For example in FIG. 7, the voltage provision circuit 700 includes a pump circuit 710, which further includes a first comparator 712, a second comparator 714, an oscillator 716, a voltage pump 718, and a pair of resistors, 720 and 730.

The first comparator 712 has two inputs, one of which is configured to receive a first reference voltage VREF1 and the other of which is configured to receive a feedback signal 701, which will be discussed below. As such, the first comparator 712 can compare the first reference voltage VREF1 with the feedback signal 701. Based on a comparison between the first reference voltage VREF1 and the feedback signal 701, the first comparator 712 can output a first enable signal 713 at a certain logic state to the oscillator 716. Upon receiving the first enable signal 713 with such a logic state, the oscillator 716 can output a clock signal 717 to the voltage pump 718. Based on the clock signal 717, the voltage pump 718 can boost (e.g., pump) a supply voltage (e.g., VDD) to a multiple of the supply voltage at an output of the pump circuit 718 as a first level of the output voltage Vout.

The second comparator 714 has two inputs, one of which is configured to receive a second reference voltage VREF2 and the other of which is configured to receive the feedback signal 701. As such, the second comparator 714 can compare the second reference voltage VREF2 with the feedback signal 701. Based on a comparison between the second reference voltage VREF2 and the feedback signal 701, the second comparator 714 can output a second enable signal 715 at a certain logic state directly to the voltage pump 718. With the second enable signal 715 at such a logic state, the voltage pump 718 can activate or otherwise induce more capacitance so as to further boost the output voltage Vout to a second, higher level, in some embodiments. For example, the voltage pump 718 may include a plural number of capacitors, e.g., 740 and 750, where the capacitor 740 is constantly controlled by the clock signal 717 and the capacitor 750 is selectively controlled by the clock signal 717. In one aspect, the capacitor 750 is coupled to the clock signal 717 through a switch 755 that is turned on by the second enable signal 715. When the second enable signal 715 reaches the configured logic state, the switch 755 is turned on, causing the clock signal 717 to couple to the capacitor 750. As a result, the voltage pump 718 can further boost the output voltage Vout to the second level.

Figure 8:
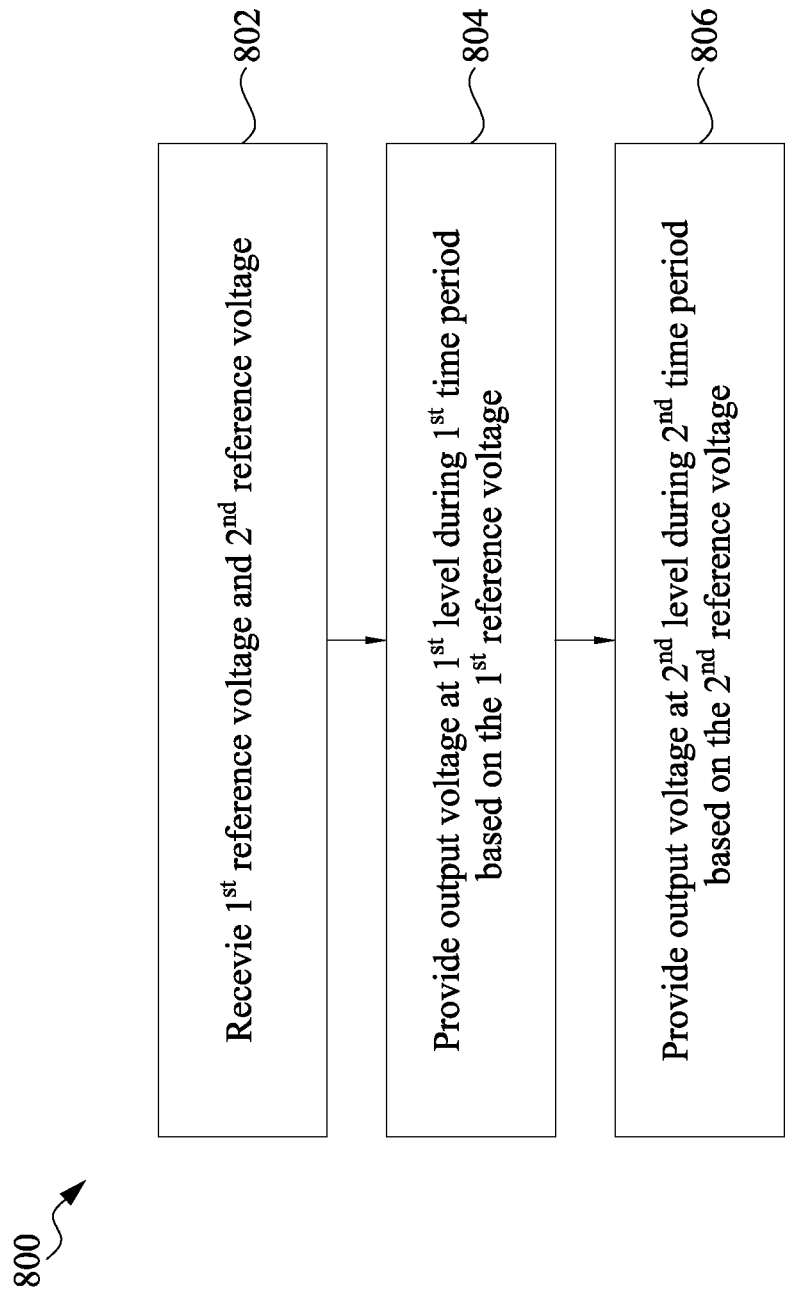
FIG. 8 illustrates an example flow chart of a method for operating a voltage provision circuit, in accordance with some embodiments.

FIG. 8 illustrates a flow chart of an example method 800 for operating a voltage provision circuit, in accordance with some embodiments. The method 800 may be performed to operate the circuit 400 (FIG. 4) or the circuit 700 (FIG. 7), and thus, in the following discussion of operations of the method 800, the reference numerals used in FIG. 4 or 7 may be reused. It is noted that the method 800 is merely an example and is not intended to limit the present disclosure. Accordingly, it is understood that additional operations may be provided before, during, and after the method 800 of FIG. 8, and that some other operations may only be briefly described herein.

The method 800 starts with operation 802 in which a first reference voltage and a second reference voltage are received. Using the voltage provision circuit 400 of FIG. 4 as a non-limiting example, the first reference voltage VREF1 and the second reference voltage VREF2 may be received by the first pump circuit 410 and second pump circuit 430, respectively. In some embodiments, the second reference voltage VREF2 may be configured higher than the first reference voltage VREF1. As such, the first pump circuit 410 may be first activated to boost the output voltage Vout to a first level, followed by the second pump circuit 430 activated to continue boosting the output voltage Vout to a second, higher level.

The method 800 proceeds to operation 804 in which, during a first time period, an output voltage at a first level is provided based on the first reference voltage. During the first time period, the output voltage can be boosted to a first level based on the first reference voltage. Continuing with the above example, the comparator 412 (of the first pump circuit 410) can compare the first reference voltage VREF1 with the feedback signal 401, which is a fraction of the output voltage Vout, and provide the enable signal 413 at a logic state (e.g., logic 1) in response to determining that the feedback signal 401 has been equal to or greater than the first reference voltage VREF1. Next, the oscillator 414 (of the first pump circuit 410) can be activated by the enable signal 413 to generate the clock signal 415. The voltage pump 416 (of the first pump circuit 410) can then boost a supply voltage as the output voltage Vout at the first level.

The method 800 proceeds to operation 806 in which, during a second time period, the output voltage at a second level is provided based on the second reference voltage. During the second time period, the output voltage can be further boosted to a second level based on the second reference voltage. Continuing with the above example, the comparator 432 (of the second pump circuit 430) can compare the second reference voltage VREF2 with the same feedback signal 401, and provide the enable signal 433 at a logic state (e.g., logic 1) in response to determining that the feedback signal 401 has been equal to or greater than the second reference voltage VREF2. Next, the oscillator 434 (of the second pump circuit 430) can be activated by the enable signal 433 to generate the clock signal 435. The voltage pump 436 (of the second pump circuit 430) can then further boost the supply voltage as the output voltage Vout at the second level.

Figure 9:
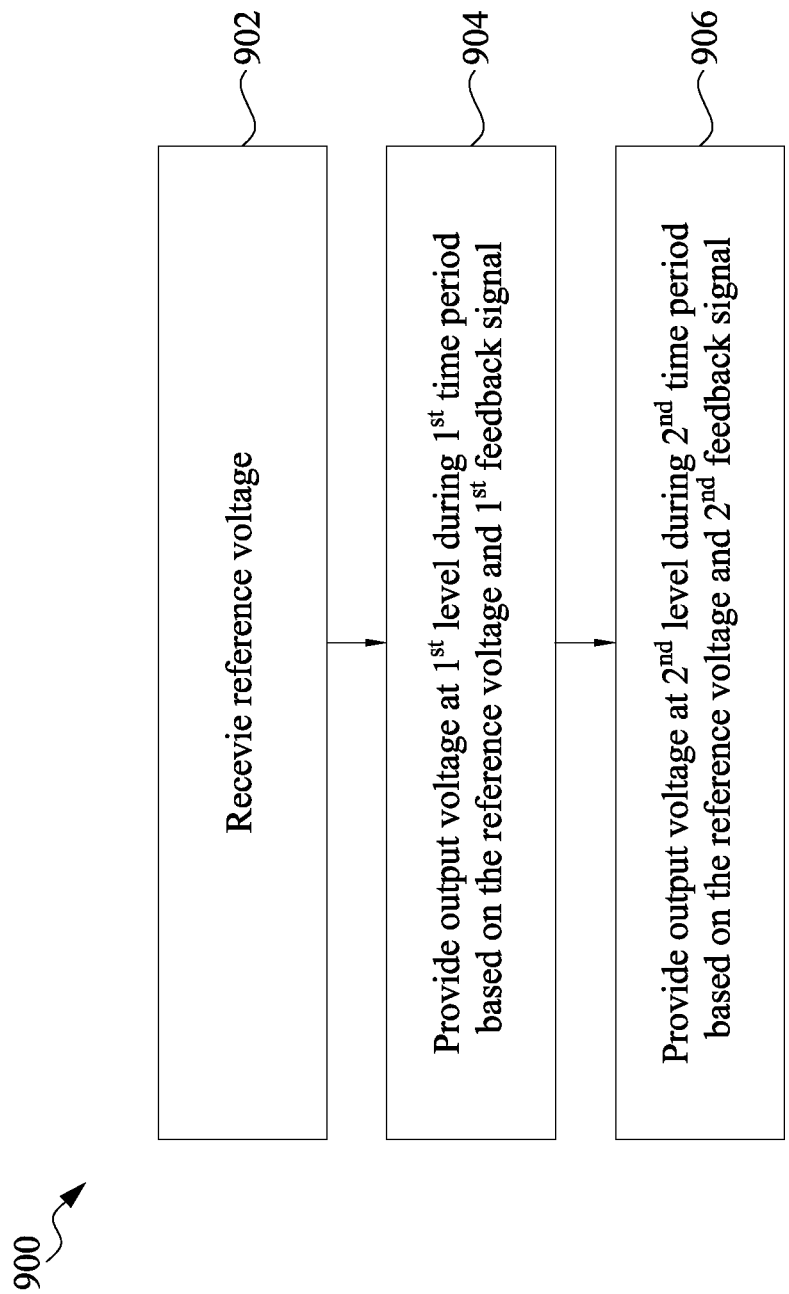
FIG. 9 illustrates an example flow chart of another method for operating a voltage provision circuit, in accordance with some embodiments.

FIG. 9 illustrates a flow chart of an example method 900 for operating a voltage provision circuit, in accordance with some embodiments. The method 900 may be performed to operate the circuit 500 (FIG. 5) or the circuit 600 (FIG. 6), and thus, in the following discussion of operations of the method 900, the reference numerals used in FIG. 5 or 6 may be reused. It is noted that the method 900 is merely an example and is not intended to limit the present disclosure. Accordingly, it is understood that additional operations may be provided before, during, and after the method 900 of FIG. 9, and that some other operations may only be briefly described herein.

The method 900 starts with operation 902 in which a reference voltage is received. Using the voltage provision circuit 600 of FIG. 6 as a non-limiting example, the reference voltage VREF may be received by the first pump circuit 610 and second pump circuit 630. In some embodiments, the first pump circuit 610 and second pump circuit 630 may compare the reference voltage VREF with the first feedback signal 601 and the second feedback signal 603, respectively. The first feedback signal 601 and the second feedback signal 603 may correspond to a first fraction and a second fraction of the output voltage Vout, respectively, in which the first fraction is different from the second fraction. As such, the first pump circuit 610 may be first activated to boost the output voltage to a first level, followed by the second pump circuit 630 activated to continue boosting the output voltage to a second, higher level.

The method 900 proceeds to operation 904 in which, during a first time period, an output voltage at a first level is provided based on the reference voltage and a first feedback signal. During the first time period, the output voltage can be boosted to a first level based on comparing the reference voltage with a first feedback signal. Continuing with the above example, the comparator 612 (of the first pump circuit 610) can compare the reference voltage VREF with the feedback signal 601, which is a first fraction of the output voltage Vout, and provide the enable signal 613 at a logic state (e.g., logic 1) in response to determining that the feedback signal 601 has been equal to or greater than the reference voltage VREF. Next, the oscillator 614 (of the first pump circuit 610) can be activated by the enable signal 613 to generate the clock signal 615. The voltage pump 616 (of the first pump circuit 610) can then boost a supply voltage as the output voltage Vout at the first level.

The method 900 proceeds to operation 906 in which, during a second time period, an output voltage at a second level is provided based on the reference voltage and a second feedback signal. During the second time period, the output voltage can be further boosted to a second level based on comparing the reference voltage with a second feedback signal. Continuing with the above example, the comparator 632 (of the second pump circuit 630) can compare the reference voltage VREF with the feedback signal 603, which is a second fraction of the output voltage Vout, and provide the enable signal 633 at a logic state (e.g., logic 1) in response to determining that the feedback signal 603 has been equal to or greater than the reference voltage VREF. Next, the oscillator 634 (of the second pump circuit 630) can be activated by the enable signal 633 to generate the clock signal 635. The voltage pump 636 (of the second pump circuit 630) can then boost the supply voltage as the output voltage Vout at the second level.

Figure 10:
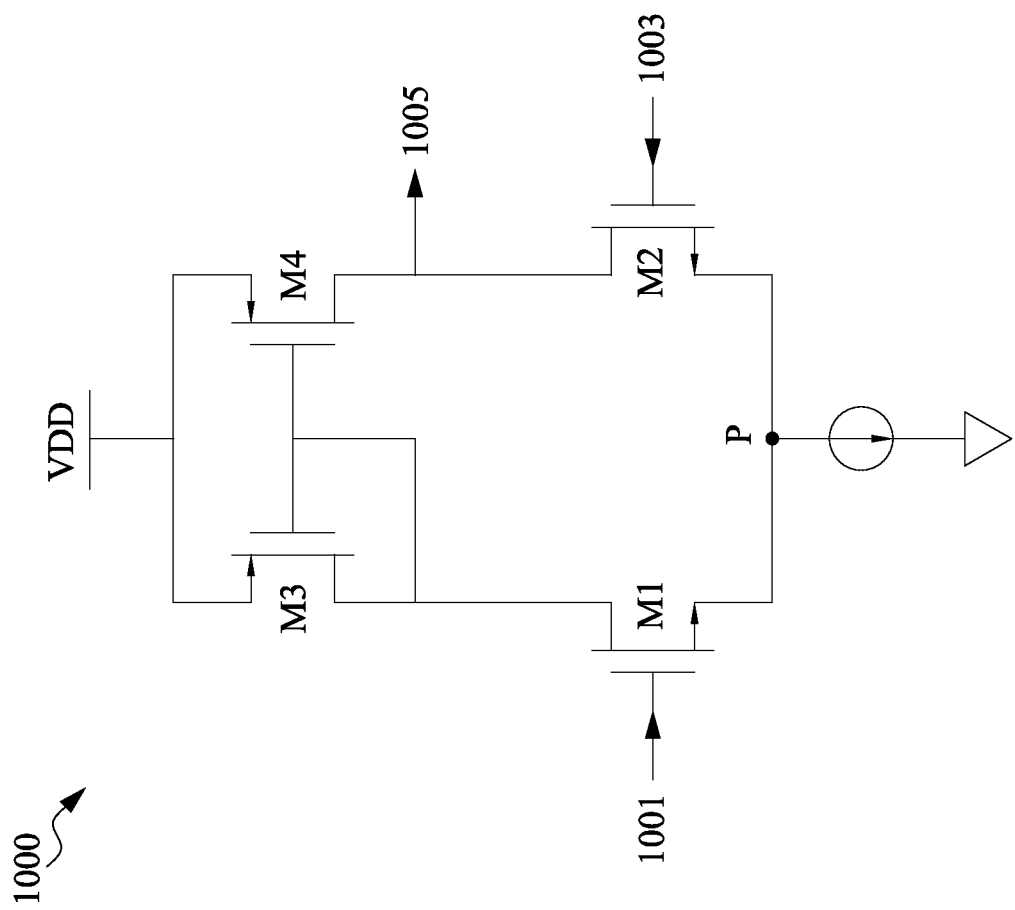
FIG. 10 illustrates an example circuit diagram of a comparator of a voltage provision circuit, in accordance with some embodiments.

FIG. 10 illustrates an example circuit diagram of a comparator 1000, in accordance with some embodiments. The comparator 1000 may be an implementation of each of the above-discussed comparators, 412, 432, 512, 532, 612, 632, 712, and 714. The circuit diagram of FIG. 10 is provided for illustrative purposes, and it should be appreciated that the comparators, 412, 432, 512, 532, 612, 632, 712, and 714 may each be implemented as any of various other comparators while remaining within the scope of the present disclosure.

As shown, the comparator 1000 includes transistors M1, M2, M3, and M4 coupled between VDD and ground. The transistors M1 and M2 are configured in n-type, and the transistors M3 and M4 are configured in p-type. Further, the transistors M1 and M2 have their source connected to ground via a current source. The transistors M1 and M2 may have their gates configured to receive signals 1001 and 1003, respectively, and the transistors M4 and M2 are connected to each other at a common node that presents a signal 1005. The signals 1001 and 1003 can correspond to a reference voltage and a feedback signal of each of the above-described comparators 412, 432, 512, 532, 612, 632, 712, and 714, respectively. The signal 1005 can correspond to an enable signal outputted by each of such comparators. In some embodiments, the transistors M1 and M2, configured to respectively receive the reference voltage (1001) and the feedback signal (1003), are configured in the same size. As such, the comparator 1000 may output the enable signal (1005) at logic high in response to determining that the feedback signal is equal to or greater than the reference voltage. In some other embodiments, the transistors M1 and M2, configured to respectively receive the reference voltage (1001) and the feedback signal (1003), are configured in different sizes. As such, the comparator 1000 may output the enable signal (1005) at logic high in response to determining that the feedback signal, with an offset, is equal to or greater than the reference voltage.

Figure 11:
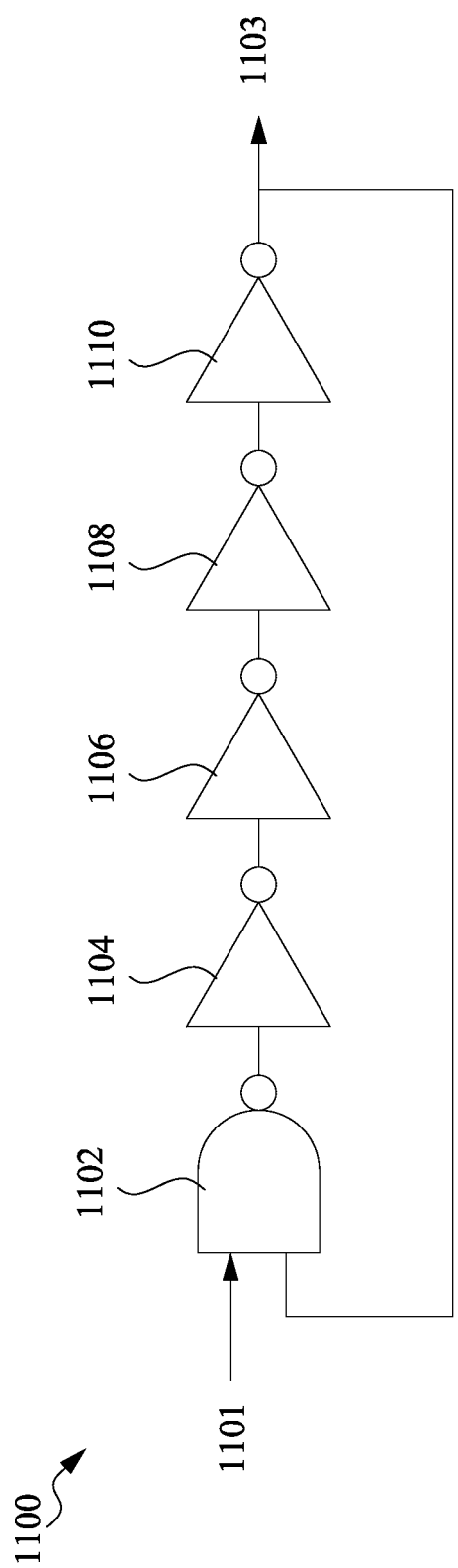
FIG. 11 illustrates an example circuit diagram of an oscillator of a voltage provision circuit, in accordance with some embodiments.

FIG. 11 illustrates an example circuit diagram of an oscillator 1100, in accordance with some embodiments. The oscillator 1100 may be an implementation of each of the above-discussed oscillators, 414, 434, 514, 534, 614, 634, and 716. The circuit diagram of FIG. 11 is provided for illustrative purposes, and it should be appreciated that the oscillators, 414, 434, 514, 534, 614, 634, and 716 may each be implemented as any of various other oscillators while remaining within the scope of the present disclosure.

As shown, the oscillator 1100 is configured as a ring oscillator, which includes a NAND gate 1102, and a plural number of inverters, 1104, 1106, 1108, and 1110 that are coupled to one another as a loop or ring. Specifically, the NAND gate 1102 has a first input configured to receive an input signal 1101 (which can be the enable signal, e.g., 1005, outputted by the comparator 1000), a second input connected to an output of the last inverter 1110, and an output connected to an input of the first inverter 1104. The first inverter 1104 can have its output connected to the input of a next inverter (e.g., 1106), and so on. In general, when the enable signal 1102 is at logic high, the oscillator 1100 can start oscillate with a frequency, e.g., providing an output signal 1103 as a clock signal. The clock signal 1103 can correspond to a clock signal outputted by each of the above-discussed oscillators, 414, 434, 514, 534, 614, 634, and 716.

Figure 12:
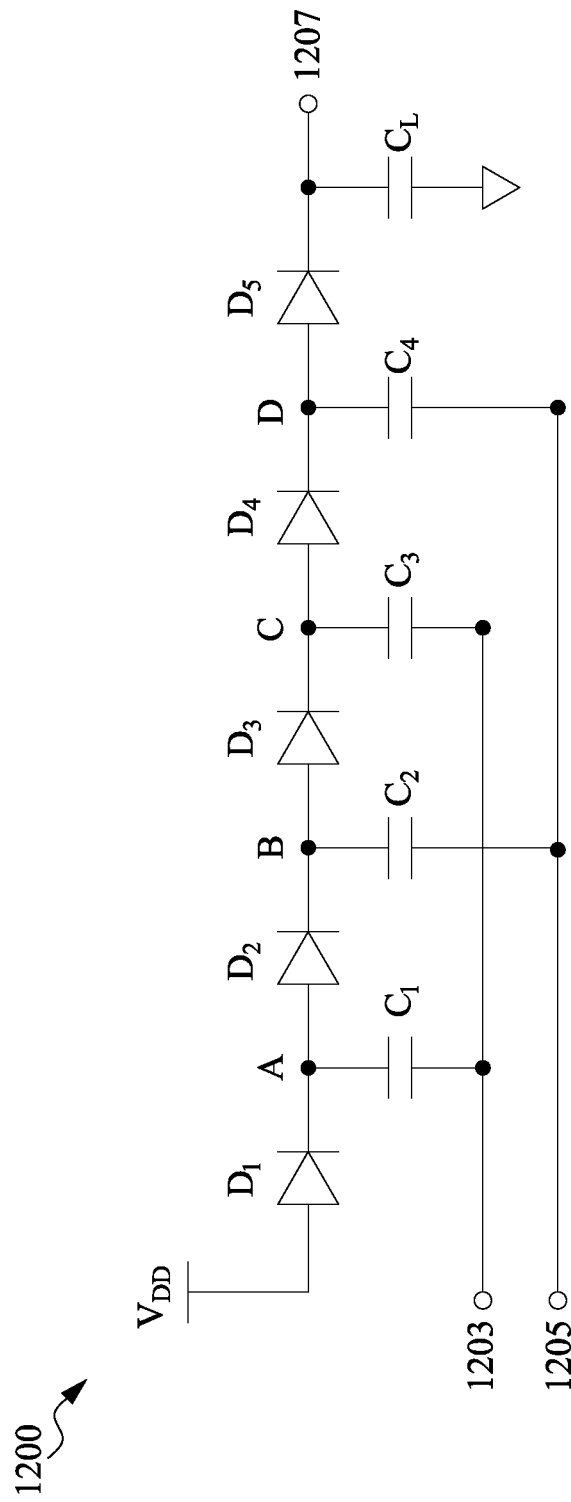
FIG. 12 illustrates an example circuit diagram of a voltage pump of a voltage provision circuit, in accordance with some embodiments.

FIG. 12 illustrates an example circuit diagram of a voltage pump 1200, in accordance with some embodiments. The voltage pump 1200 may be an implementation of each of the above-discussed voltage pumps, 416, 436, 516, 536, 616, 636, and 718. The circuit diagram of FIG. 12 is provided for illustrative purposes, and it should be appreciated that the voltage pumps, 416, 436, 516, 536, 616, 636, and 718 may each be implemented as any of various other voltage pumps while remaining within the scope of the present disclosure.

As shown, the voltage pump 1200 includes a plural number of diodes, D1, D2, D3, D4, and D5, or otherwise switches that can be turned on or off based on clock signal 1203 and its logically inverse signal 1205. The clock signal 1203 can be the signal 1103 outputted by the oscillator 1100. Specifically, the first diode D1 is connected to a supply voltage VDD with its other terminal connected to the next diode D2 and a capacitor C1; the other terminal of the diode D2 is connected to the next diode D3 and a capacitor C2; the other terminal of the diode D3 is connected to the next diode D4 and a capacitor C3; the other terminal of the diode D4 is connected to the next diode D5 and a capacitor C4; and the other terminal of the diode D5 is connected to a load capacitor CL and configured to output a signal 1207, which can be boosted based on the supply voltage VDD. The boosted signal 1207 can be the output voltage Vout outputted by each of the voltage pumps, 416, 436, 516, 536, 616, 636, and 718, as discussed above. The capacitors C1 and C3 are coupled to the clock signal 1203, while the capacitors C2 and C4 (alternately arranged with respect to the capacitors C1 and C3) are coupled to the inverse clock signal 1205, which allows charges (voltages) to be accumulated at nodes A, B, C, and D. For example, the voltages at nodes A, B, C, and D can be VDD, 2×VDD, 3×VDD, and, 4×VDD, respectively. In general, the number of the capacitors and/or the capacitive amount of a voltage pump may correspond to a driving capability of the voltage pump. For example, a first voltage pump may have a stronger driving capability than a second voltage pump, when the first voltage pump has a more number of capacitors and/or a larger amount of capacitance than the second voltage pump.

In one aspect of the present disclosure, a circuit is disclosed. The circuit includes a first pump circuit configured to receive a first reference voltage and provide an output voltage based on the first reference voltage. The circuit includes a second pump circuit configured to receive a second reference voltage and provide the output voltage based on the second reference voltage. The first reference voltage is different from the second reference voltage.

In another aspect of the present disclosure, a circuit is disclosed. The circuit includes a first pump circuit configured to receive a first reference voltage and provide an output voltage at a first level based on the first reference voltage. The circuit includes a second pump circuit configured to receive a second reference voltage and provide the output voltage at a second level based on the second reference voltage. The first reference voltage is lower than the second reference voltage, and the first level is lower than the second level.

In yet another aspect of the present disclosure, a method is disclosed. The method includes receiving a first reference voltage and a second reference voltage. The method includes providing, during a first time period, an output voltage at a first level based on the first reference voltage. The method includes providing, during a second time period, the output voltage at a second level based on the second reference voltage. The first reference voltage is lower than the second reference voltage, and the first level is lower than the second level.

As used herein, the terms "about" and "approximately" generally indicates the value of a given quantity that can vary based on a particular technology node associated with the subject semiconductor device. Based on the particular technology node, the term "about" can indicate a value of a given quantity that varies within, for example, 10-30% of the value (e.g., +10%, ±20%, or ±30% of the value).

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A circuit, comprising:
a first pump circuit configured to receive a first reference voltage and provide an output voltage based on the first reference voltage, the first pump circuit comprising a first amount of capacitance; and
a second pump circuit configured to receive a second reference voltage and provide the output voltage based on the second reference voltage, the second pump circuit comprising a second amount of capacitance less than the first amount of capacitance;
wherein the first reference voltage is different from the second reference voltage;
wherein the first pump circuit with the first amount of capacitance is activated to generate the output voltage at a first level; and
wherein responsive to the output voltage reaching the first level, the second pump circuit with the second amount of capacitance is activated to generate the output voltage at a second level.

2. The circuit of claim 1,
wherein the first pump circuit comprises:
a first comparator;
a first oscillator; and
a first voltage pump; and
wherein the second pump circuit comprises:
a second comparator;
a second oscillator; and
a second voltage pump.

3. The circuit of claim 2,
wherein the first voltage pump is configured to receive the first reference voltage and a feedback signal, and provide a first enable signal to the first oscillator; and
wherein the second voltage pump is configured to receive the second reference voltage and the feedback signal, and provide a second enable signal to the second oscillator.

4. The circuit of claim 3, further comprising:
a first resistor; and
a second resistor connected to the first resistor at a common node;
wherein the first and second feedback signals are each equal to a voltage present at the common node.

5. The circuit of claim 3, wherein the first reference voltage is lower than the second reference voltage.

6. The circuit of claim 3, wherein the first enable signal is configured to selectively activate the first oscillator, causing the first voltage pump to generate the output voltage at the first level.

7. The circuit of claim 6, wherein the second enable signal is configured to selectively activate the second oscillator, causing the second voltage pump to generate the output voltage at the second level, and wherein the second level is higher than the first level.

8. The circuit of claim 7, wherein the second oscillator is activated while the first oscillator is deactivated.

9. The circuit of claim 1, wherein the first pump circuit is deactivated in response to the output voltage reaching the first level, and wherein the second pump circuit is activated in response to deactivating the first pump circuit.

10. A circuit, comprising:
a first pump circuit configured to receive a first reference voltage and provide an output voltage at a first level based on the first reference voltage, the first pump circuit comprising a first amount of capacitance; and
a second pump circuit configured to receive a second reference voltage and provide the output voltage at a second level based on the second reference voltage, the second pump circuit comprising a second amount of capacitance less than the first amount;
wherein the first reference voltage is lower than the second reference voltage, and the first level is lower than the second level; and
wherein responsive to the output voltage generated from the first pump circuit with the first amount of capacitance reaching the first level, the second pump circuit with the second amount of capacitance is activated to generate the output voltage at the second level.

11. The circuit of claim 10,
wherein the first pump circuit comprises:
a first comparator;
a first oscillator; and
a first voltage pump; and
wherein the second pump circuit comprises:
a second comparator;
a second oscillator; and
a second voltage pump.

12. The circuit of claim 11,
wherein the first voltage pump is configured to receive the first reference voltage and a first feedback signal, and provide a first enable signal to the first oscillator; and
wherein the second voltage pump is configured to receive the second reference voltage and a second feedback signal, and provide a second enable signal to the second oscillator.

13. The circuit of claim 12, wherein the first comparator is configured to generate the first enable signal based on the first reference voltage and the first feedback signal, and the second comparator is configured to generate the second enable signal based on the second reference voltage and the second feedback signal.

14. The circuit of claim 12, further comprising:
a first resistor; and
a second resistor connected to the first resistor at a common node;
wherein the first and second feedback signals are each equal to a voltage present at the common node.

15. The circuit of claim 12, wherein the first enable signal is configured to selectively activate the first oscillator, causing the first voltage pump to generate the output voltage at the first level, and the second enable signal is configured to selectively activate the second oscillator, causing the second voltage pump to generate the output voltage at the second level.

16. The circuit of claim 15, wherein the second oscillator is activated while the first oscillator is deactivated.

17. A method, comprising:
receiving a first reference voltage and a second reference voltage;
providing, by a first pump circuit comprising a first amount of capacitance, during a first time period, an output voltage at a first level based on the first reference voltage; and
providing, by a second pump circuit comprising a second amount of capacitance less than the first amount of capacitance, responsive to the output voltage reaching the first level and during a second time period, the output voltage at a second level based on the second reference voltage;
wherein the first reference voltage is lower than the second reference voltage, and the first level is lower than the second level.

18. The method of claim 17, further comprising:
generating, during the first time period, a first enable signal based on the first reference voltage and a first feedback signal that is a fraction of the first level; and
generating, during the second time period, a second enable signal based on the second reference voltage and a second feedback signal that is the fraction of the second level.

19. The method of claim 18, further comprising:
activating, during the first time period, according to a logic state of the first enable signal, a first oscillator so as to cause a first voltage pump to generate the output voltage at the first level; and
activating, during the second time period, according to a logic state of the second enable signal, a second oscillator so as to cause a second voltage pump to generate the output voltage at the second level.

20. The method of claim 19,
wherein the first pump circuit comprises:
a first comparator;
the first oscillator; and
the first voltage pump; and
wherein the second pump circuit comprises:
a second comparator;
the second oscillator; and
the second voltage pump.

\* \* \* \* \*